(No Model.)

M. YOUNG.
MEDICINE SPOON.

No. 423,018. Patented Mar. 11, 1890.

Witnesses:
John R. Petterstrom
Jean Elliott

Inventor:
Maximilian Young

By Burton and Burton
his Attorneys

UNITED STATES PATENT OFFICE.

MAXIMILIAN YOUNG, OF CHICAGO, ILLINOIS.

MEDICINE-SPOON.

SPECIFICATION forming part of Letters Patent No. 423,018, dated March 11, 1890.

Application filed May 15, 1889. Serial No. 310,793. (No model.)

*To all whom it may concern:*

Be it known that I, MAXIMILIAN YOUNG, a citizen of the United States, residing at Chicago, county of Cook, and State of Illinois, have invented certain new and useful Improvements in a Medicine-Spoon, which are fully set forth in the following specification, reference being had to the accompanying drawings, forming a part thereof.

Figure 1:
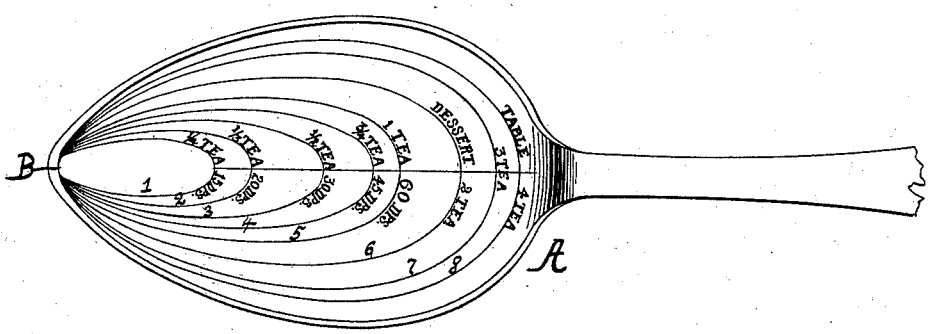
Figure 2:
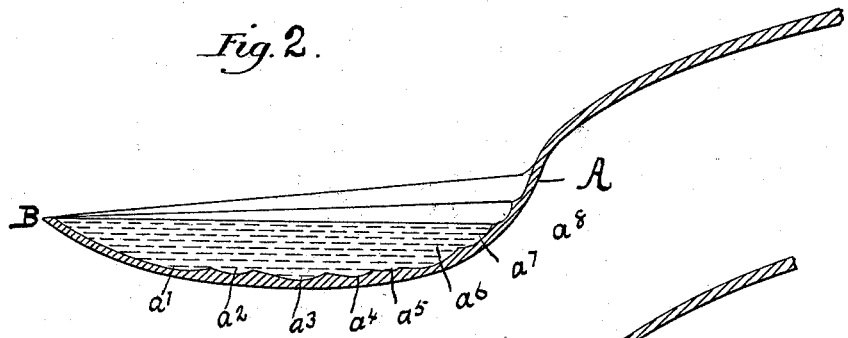
Figure 3:
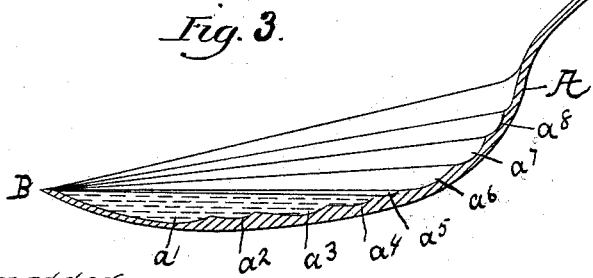

Figure 1 is a plan. Fig. 2 is a longitudinal section in one position; Fig. 3, a longitudinal section in a different position.

The purpose of this invention is to provide a convenient implement in the form of a spoon for the purpose of measuring and administering doses of medicine when prescribed by tea-spoonfuls, dessert-spoonfuls, or table-spoonfuls, or fractions of tea-spoonfuls, or by number of drops.

I have represented in the drawings, on an enlarged scale, a table-spoon graduated to indicate less quantities than the table-spoonful down to one-quarter of a tea-spoonful or fifteen drops. In practice it will probably be more convenient to graduate such spoon only down to one tea-spoonful and to provide for subdivisions of a tea-spoonful in a separate spoon whose maximum indication shall be one tea-spoonful and which shall be graduated for fractions of a tea-spoonful and for drops in any desired number.

The essential feature of the invention is the mode of graduating the spoon, which consists in indicating upon its interior surface the several fractional quantities by lines which mark the intersection with the interior surface of the spoon, of planes cutting off below them, respectively, the quantities indicated and passing through the forward point of the spoon, that being the point of delivery or discharge in emptying it. The advantage of this mode of indicating the subdivisions of the largest quantity is that to reach any desired quantity precisely it is necessary only to pour into the spoon enough and then tilt the spoon until the liquid will flow out over the point and allow it to flow until the level of the liquid reaches the line which indicates the desired quantity, which can therefore be reached with precision, because it is not necessary to change the position of the spoon after having discharged a portion in order to bring the liquid back to the position where its level can be compared with the indicating-line, as is the case when the several lines indicating successive quantities are concentric, as in the form of measuring-spoons now in use. Another advantage of this form is, that the spoon having first been filled to the highest quantity indicated— tablespoonful or four tea-spoonfuls—any desired quantity—as, for example, one tea-spoonful—may be measured out from it into another receptacle by tilting the spoon until the liquid level reaches the line indicating three tea-spoonfuls, and in like manner continuing to pour successive quantities out from the whole quantity at first contained in the spoon, the entire quantity—four tea-spoonfuls—may be subdivided into four equal parts accurately without resorting to any expedient other than interruping the pouring long enough to substitute a different receptacle as the liquid level reaches successively the marks indicating three tea-spoonfuls, two tea-spoonfuls, and one tea-spoonful, the same facility of subdivision is afforded in the graduation of the spoon below the tea-spoonful mark into fractions of a tea-spoon, three-quarters, one-half, one-third, one-fourth, and other fractions which may be deemed convenient.

As a further means of insuring precision in measuring the desired quantities, the inner surface of the spoon may be formed, as indicated in Figs. 2 and 3, so that the margin of the several fractional quantities of the whole spoonful shall be indicated not merely by a line on the smooth interior surface of the spoon, but by a distinct edge for each fractional quantity. This is effected by grooving the interior surface, as illustrated, the form of grooves $a^2$, $a^3$, $a^4$, $a^5$, $a^6$, $a^7$, and $a^8$ being such that the horizontal plane of the surface of the liquid filling the spoon up to any one of such margins or edges is tangent to the curve next beyond that edge. From this it will result that in emptying the spoon from one level to another the liquid will flow off and out from each groove successively in the next forward, there being no ridge or rib behind which it might lodge or be detained, notwithstanding that there is an elevation in the bottom of the spoon at each graduation-line.

In the drawings, A represents the bowl of the spoon; B, the forward or delivering point. The lines 1, 2, 3, 4, 5, 6, 7, and 8 are the graduation-lines indicating one-fourth of a tea-spoonful or fifteen drops, one-third of a tea-spoonful or twenty drops, one-half of a tea-spoonful or thirty drops, three-quarters of a tea-spoonful or forty-five drops, one tea-spoonful or sixty drops, one dessert or two tea-spoonfuls, three tea-spoonfuls, and one table-spoonful or four tea-spoonfuls.

$a'$ is the portion at the forward part of the spoon, which contains the lowest quantity indicated—fifteen drops.

$a^2$ is the next groove, whose farther margin (indicated by the line 2) bounds one-third tea-spoonful; $a^3$, the groove whose farther margin (indicated by the line 3) bounds one-half tea-spoonful; $a^4$, the groove whose farther margin (indicated by the line 4) bounds three-fourths tea-spoonful; $a^5$, the groove whose farther margin (indicated by the line 5) bounds one tea-spoonful; $a^6$, the groove whose farther margin (indicated by the line 6) bounds one dessert-spoonful; $a^7$, the groove whose farther margin (indicated by the line 7) bounds three tea-spoonfuls, and $a^8$ the groove whose farther margin (indicated by the line 8) bounds one table-spoonful.

I claim—

A medicine-spoon having the interior surface of its bowl subdivided by lines inclosing successive subdivisions of its entire capacity, such lines being the lines of intersection with the interior surface of the bowl or planes converging and all intersecting at the forward and delivery point of the spoon, substantially as set forth.

In testimony whereof I have hereunto set my hand, in the presence of two witnesses, at Chicago, Illinois, this 8th day of May, 1889.

MAXIMILIAN YOUNG.

Witnesses:
CHAS. S. BURTON,
JEAN ELLIOTT.